(12) United States Patent
Chen et al.

(10) Patent No.: US 8,358,991 B2
(45) Date of Patent: Jan. 22, 2013

(54) TRANSCONDUCTANCE ENHANCED RF FRONT-END

(75) Inventors: Xinyu Chen, Irvine, CA (US); Calvin (Shr-Lung) Chen, Irvine, CA (US); John Leete, Huntington Beach, CA (US)

(73) Assignee: Broadcom Corporation, Irvine, CA (US)

( * ) Notice: Subject to any disclaimer, the term of this patent is extended or adjusted under 35 U.S.C. 154(b) by 59 days.

(21) Appl. No.: 12/693,981

(22) Filed: Jan. 26, 2010

(65) Prior Publication Data

US 2011/0092180 A1 Apr. 21, 2011

Related U.S. Application Data

(60) Provisional application No. 61/252,533, filed on Oct. 16, 2009.

(51) Int. Cl.
*H04B 1/06* (2006.01)
(52) U.S. Cl. ........... 455/232.1; 455/234.1; 455/341; 330/261; 330/301
(58) Field of Classification Search .......... 455/130, 455/138, 323, 326, 333, 341, 232.1, 234.1; 330/261, 301, 311
See application file for complete search history.

(56) References Cited

U.S. PATENT DOCUMENTS

| | | | | |
|---|---|---|---|---|
| 7,626,467 | B1 * | 12/2009 | Butenhoff et al. | 331/74 |
| 8,045,943 | B2 * | 10/2011 | Kaczman et al. | 455/293 |
| 2008/0280585 | A1 * | 11/2008 | Chen et al. | 455/338 |

* cited by examiner

*Primary Examiner* — Nay A Maung
*Assistant Examiner* — Chung-Tien Yang
(74) *Attorney, Agent, or Firm* — Sterne, Kessler, Goldstein & Fox P.L.L.C.

(57) ABSTRACT

Embodiments of an RF receiver front-end are presented herein. In an embodiment, the RF receiver front-end comprises a transconductance LNA, a passive mixer, and a $g_m$-enhanced common-gate buffer. The transconductance LNA is configured to convert an RF voltage signal to an RF current signal and provide the RF current signal at an output. The passive mixer is coupled to the output of the transconductance LNA and is configured to mix the RF current signal with a local oscillator signal to produce a frequency translated current signal. The $g_m$-enhanced common-gate buffer is configured to receive the frequency translated current signal at an input and convert the frequency translated current signal to a frequency translated voltage signal. In an embodiment, the input of the gm-enhanced common-gate buffer is configured to provide a low input impedance to limit a voltage swing of the frequency translated current signal.

17 Claims, 5 Drawing Sheets

(RF Receiver Front-End)

FIG. 1 (RF Receiver Front-End)

FIG. 2 ($g_m$ LNA with output AC coupling)

FIG. 3 (Passive Mixer)

FIG. 4 ($g_m$ Enhanced Common-Gate Buffer)

FIG. 5

TRANSCONDUCTANCE ENHANCED RF FRONT-END

CROSS REFERENCE TO RELATED APPLICATIONS

This patent application claims the benefit of U.S. Provisional Patent Application No. 61/252,533, filed Oct. 16, 2009, entitled "Transconductance Enhanced RF Front-End," which is incorporated herein be reference in its entirety.

FIELD OF THE INVENTION

This application relates generally to radio frequency (RF) receivers, and more particularly to RF receiver front-ends.

BACKGROUND

There exist two commonly implemented front-end architectures in radio frequency (RF) receiver design; namely, the homodyne architecture and the heterodyne architecture. The homodyne architecture down-converts a desired channel directly from RF to baseband, whereas the heterodyne architecture down-converts a desired channel to one or more intermediate frequencies (IF) before down-conversion to baseband. In general, each of these front-end architectures employ an antenna or cable to receive an RF signal, a band-pass filter to suppress out-of-band interferers in the received RF signal, a low noise amplifier (LNA) to provide gain to the filtered RF signal, and one or more down-conversion stages.

There are several competing performance goals in the design of RF receiver front-ends, including high-gain, high-linearity, low-power, and low-noise. For example, in one commonly implemented RF receiver front-end, an additional transconductance amplifier immediately follows the LNA to provide additional gain and to convert a received RF signal from a voltage to a current. Although the transconductance amplifier provides higher-gain, the additional gain comes at the cost of reduced linearity of the amplified signal. Moreover, to ensure low-noise contribution by the transconductance stage, more power has to be expended.

In another commonly implemented RF receiver front-end, a received signal strength indicator (RSSI) module can be used in conjunction with a programmable gain LNA to improve linearity. Based on the signal strength output from the LNA, the RSSI module can adapt the gain of the LNA accordingly. For example, when an adjacent blocker is present near the desired frequency portion of an RF signal, the LNA output can be quiet large and, as a result, non-linear. The RSSI module can measure the strength of this signal, and reduce the gain of the LNA to improve its output linearity. However, the RSSI module typically does not allow for a single-chip RF receiver front-end solution, leading to increased cost. In addition, as an off-chip component, the RSSI module degrades the overall noise figure performance of the RF receiver front-end.

Therefore, what is needed is an RF receiver front-end that can provide comparatively higher-gain, higher-linearity, lower-noise, and lower-power than traditional architectures.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

The present invention will be described with reference to the accompanying drawings. The drawing in which an element first appears is typically indicated by the leftmost digit(s) in the corresponding reference number.

DETAILED DESCRIPTION

In the following description, numerous specific details are set forth in order to provide a thorough understanding of the invention. However, it will be apparent to those skilled in the art that the invention, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the invention.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

1. Overview—RF Receiver Front-End

Figure 1:
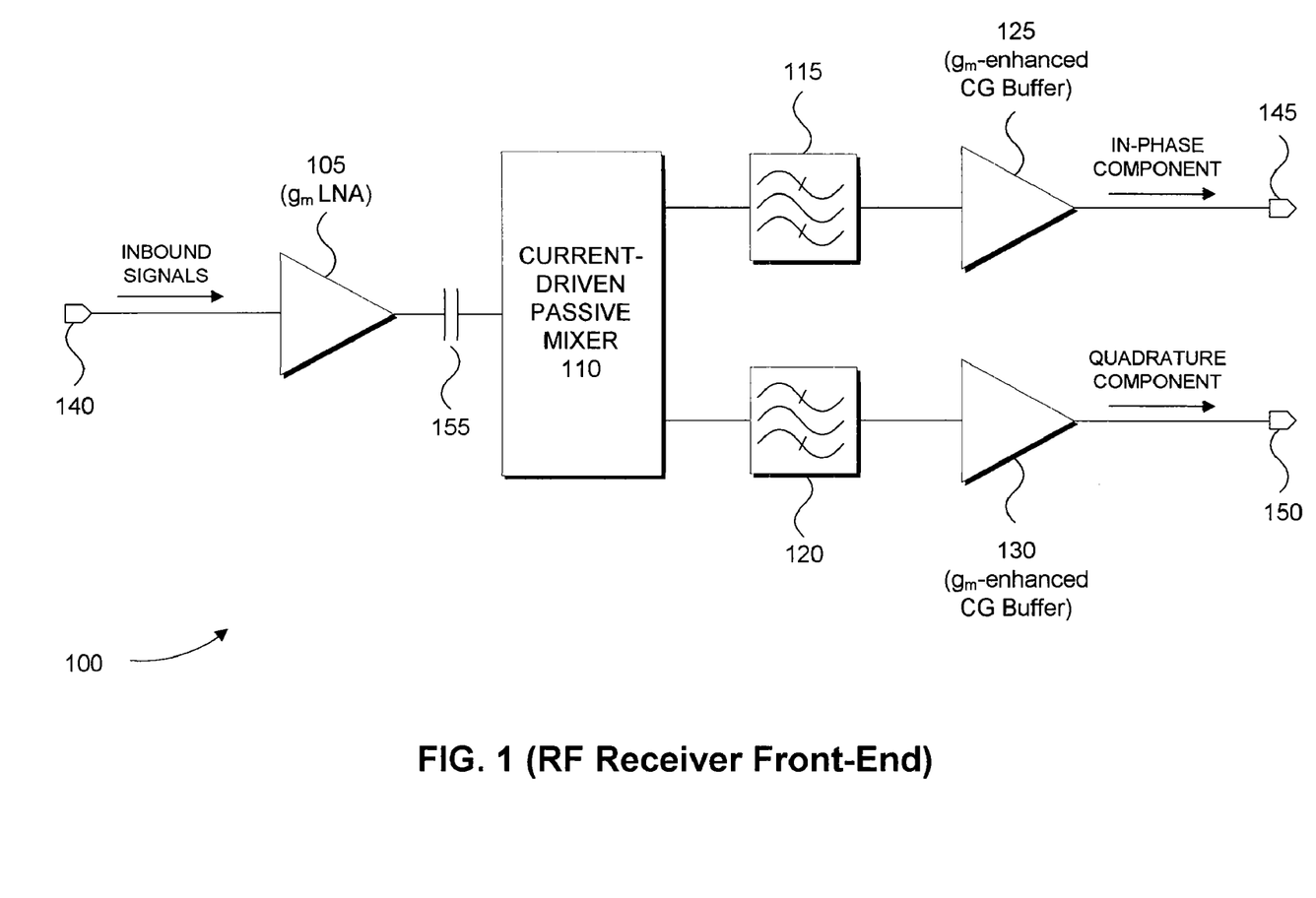
FIG. 1 illustrates a block diagram of an RF receiver front-end, according to embodiments of the present invention.

FIG. 1 illustrates a block diagram of an RF receiver front-end 100, according to embodiments of the present invention. Front-end 100 can be used within a cellular telephone, a laptop computer, a wireless local area network (WLAN) station, and/or any other device that receives RF signals. Front-end 100 includes an LNA 105, a passive mixer 110, first and second filters 115 and 120, and first and second common-gate (CG) buffers 125 and 130. Inbound RF signals are received at input 140 and are processed by front-end 100 to produce two baseband or low-IF components, commonly referred to as in-phase and quadrature components, at outputs 145 and 150, respectively.

As denoted in FIG. 1, LNA 105 is configured as a transconductance ($g_m$) amplifier and both CG buffers, 125 and 130, are $g_m$-enhanced. In other words, the effective $g_m$ of CG buffers 125 and 130 has been increased to reduce their respective input impedances. In addition, passive mixer 110 is operated in the current domain, as opposed to the voltage domain.

Thus, the general architecture of front-end 100 comprises transconductance LNA 105 coupled to current-driven passive mixer 110, which drives the low-impedance load of gm-enhanced CG buffers 125 and 130. This general architecture of front-end 100 provides for comparatively higher-gain, higher-linearity, lower-noise, and lower-power than traditional front-end architectures.

For example, because LNA 105 is configured as a $g_m$ amplifier, the need for an additional $g_m$ amplifier, immediately following the LNA in many conventional front-end architectures, is eliminated. The elimination of this additional $g_m$ amplifier can save significant power and further improve linearity.

Moreover, the elimination of the additional $g_m$ amplifier, common to many conventional front-end architectures, can further improve the overall noise performance of front-end 100. Each component in a receiver front-end, such as front-end 100, contributes noise to the overall system. The noise of a component can be characterized by its noise factor (F), which is given by the ratio of the SNR at the input of the component to the SNR at the output of the component:

$$F_{COMPONENT} = SNR_{IN}/SNR_{OUT}$$

The noise of the overall receiver front-end increases from input to output as noise from successive components compound. In general, the overall noise factor of the receiver front-end is proportional to the sum of each component's noise factor divided by the cascaded gain of preceding components and is given by:

$$F_{TOTAL} = F_1 + \frac{F_{2-1}-1}{A_1} + \frac{F_{3-1}-1}{A_1 A_2} + \ldots + \frac{F_{n-1}-1}{A_1 A_2 \ldots A_{n-1}}$$

where $F_n$ and $A_n$ represent the noise factor and gain of the nth component in the receiver front-end, respectively. The above equation reveals that the noise factor ($F_1$) and gain ($A_1$) of the first gain component can have a dominant effect on the overall noise factor of the receiver front-end, since the noise contributed by each successive component is diminished by the cascaded gain of the components that precede it. Thus, by combining the gain of LNA 105 with the gain of the additional $g_m$ amplifier common to many conventional front-ends, the noise factor of the overall front-end can be further reduced.

Operating passive mixer 110 in the current domain further improves the linearity of front-end 100. The low input impedance of CG buffers 125 and 130, coupled to the output of passive mixer 110, minimizes the voltage swing at the input of passive mixer 110. Typically, much of the non-linearity or distortion produced by conventional front-ends is associated with large voltage swings at the input of the mixer (both active and passive). The current-driven passive mixer 110 and the low input impedance of CG buffers 125 and 130, substantially eliminates this distortion.

In addition, using AC coupling 155, to couple the output of LNA 105 to the input of passive mixer 110, substantially eliminates DC current from being passed through passive mixer 110. In general, the more DC current flowing through a mixer, such as passive mixer 110, the more flicker noise the mixer will contribute to the overall front-end. Thus, using AC coupling 155 to substantially eliminate the flow of DC current through passive mixer 110, further reduces the overall noise of front-end 100.

Specific implementations of the aforementioned front-end components, according to embodiments of the present invention, will now be described. However, embodiments of the present invention are not limited to the embodiments described herein. As would be understood by a person skilled in the art based on the teachings herein, other variations of the herein described implementations may exist, and such variations are within the scope of embodiments of the present invention.

2. Transconductance LNA

Figure 2:
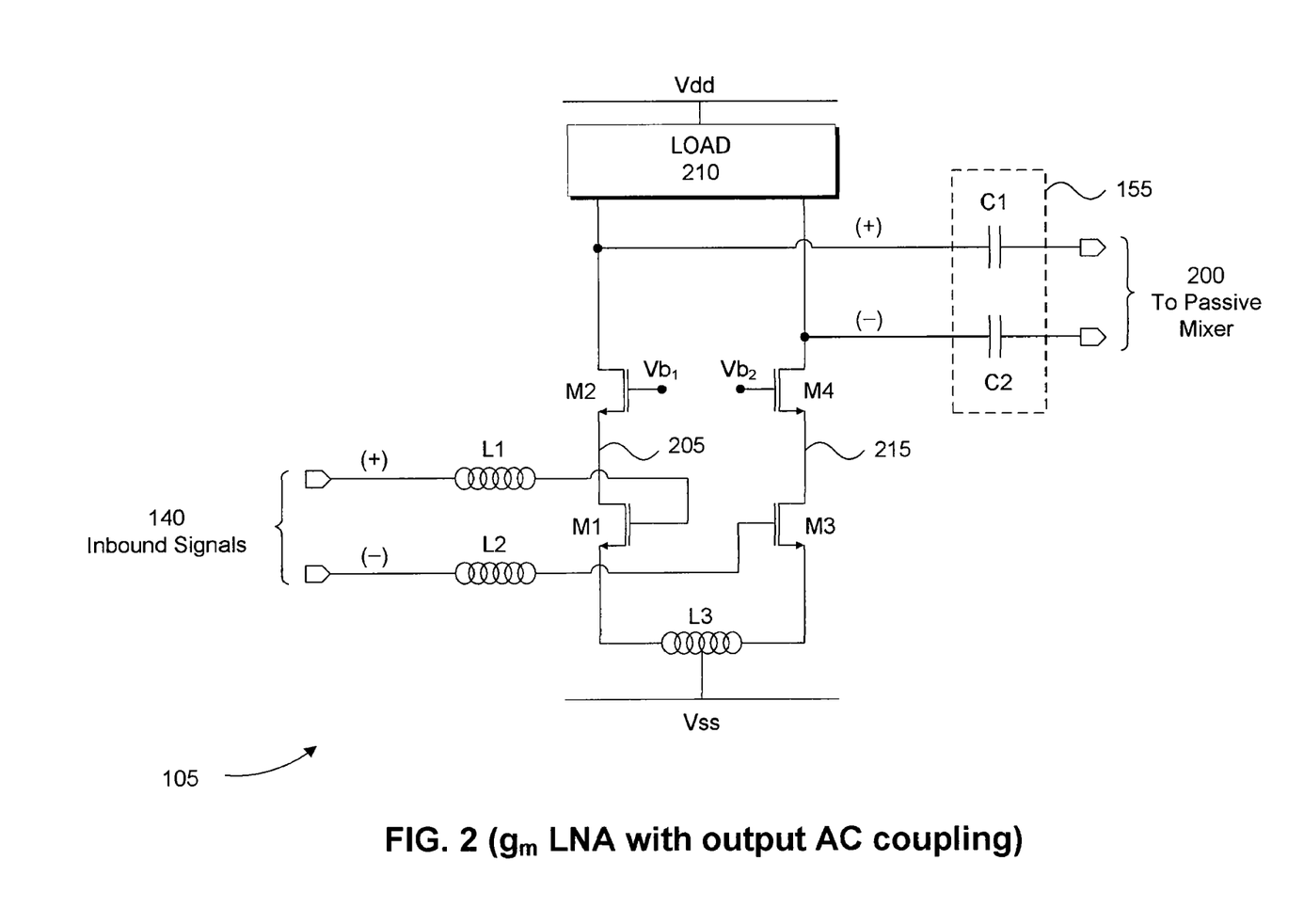
FIG. 2 illustrates an exemplary implementation of a transconductance ($g_m$) LNA, according to embodiments of the present invention.

FIG. 2 illustrates an exemplary implementation of $g_m$ LNA 105, according to embodiments of the present invention. As illustrated in FIG. 2, $g_m$ LNA 105 is configured as a common-source amplifier. Inbound voltage signals are received by $g_m$ LNA 105 at differential input 140 and an amplified version of the inbound signals are provided by $g_m$ LNA 105 at differential output 200 as current signals. Accordingly, in addition to amplification, $g_m$ LNA 105 converts a voltage input to a current output; hence $g_m$ LNA 105 is referred to as a transconductance amplifier.

LNA 105 includes a first field effect transistor (FET) M1 coupled at its gate to the positive end of differential input 140. The source of M1 is coupled to ground (Vss). The drain of M1 is coupled to the source of a second FET M2 at a node 205 in a cascode configuration. M2 is biased at its gate via bias voltage $Vb_1$. In an embodiment, M2 is used to maximize gain and provide reverse isolation. The drain of M2 is coupled through a load 210 to a supply voltage Vdd. Load 210 includes any one of a resistor, inductor, capacitor, or any combination thereof. A positive end of differential output 200 is provided at the drain of M2.

LNA 105 further includes a third FET M3 coupled at its gate to the negative end of the differential input 140. The source of M3 is coupled to ground (Vss). The drain of M3 is coupled to the source of a fourth FET M4 at a node 215 in a cascode configuration. M4 is biased at its gate via bias voltage $Vb_2$. In an embodiment, M4 is used to maximize gain and provide reverse isolation. The drain of M4 is coupled through load 210 to the supply voltage Vdd. Load 210, as noted above, includes any one of a resistor, inductor, capacitor, or any combination thereof. A negative end of differential output 200 is provided at the drain of M4.

LNA 105, as illustrated in FIG. 2, has been implemented to contribute substantially minimal noise to front-end 100 and to provide enough gain (i.e., transconductance) to sufficiently reduce the input referred noise of following stages. The input stage of LNA 105 is formed by FETs M1 and M3.

In addition, a desired input impedance, typically 50 Ohms, has been synthesized using a differential approach. The input stage of LNA 105 is inductively degenerated using inductor L3, coupled between the respective sources of FETs M1 and M3 and ground (Vss). The linearity of LNA 105 is improved using source degeneration inductor L3, which also adjusts the input impedance seen looking into the gates of FETs M1 and M3, together with inductors L1 and L2, to match a desired impedance. In an embodiment, on-chip spiral inductors are used to implement inductor L3, whereas bond-wire inductors are used to implement inductors L1 and L2.

AC coupling 155, as noted above, is used to couple the output of LNA 105 to the input of passive mixer 110. AC coupling 155 substantially eliminates DC current from being passed through passive mixer 110 from LNA 105. In general, the more DC current flowing through a mixer, such as passive mixer 110, the more flicker noise the mixer will contribute to the overall front-end. Thus, using AC coupling 155 to substantially eliminate the flow of DC current through passive mixer 110, further reduces the overall noise of front-end 100. As illustrated in FIG. 2, AC coupling 155 includes two appropriately sized capacitors C1 and C2 that effectively filter (i.e., block) DC signals produced by LNA 105 from coupling to passive mixer 110.

3. Passive Mixer

Figure 3:
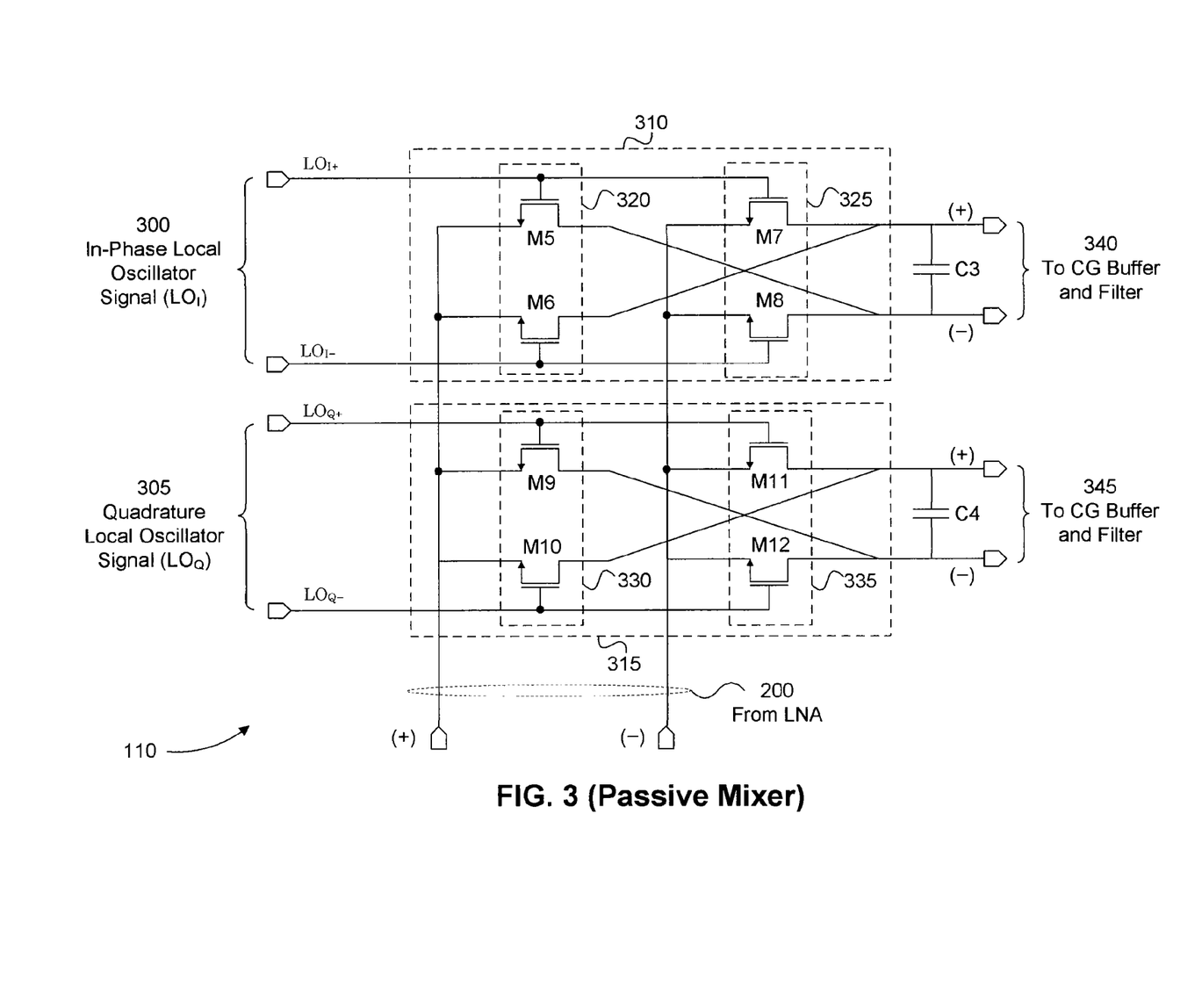
FIG. 3 illustrates an exemplary implementation of a passive mixer, according to embodiments of the present invention.

FIG. 3 illustrates an exemplary implementation of passive mixer 110, according to embodiments of the present invention. Passive mixer 110 includes double-balanced mixers 310 and 315. Double-balanced mixer 310 includes switching devices M5, M6, M7, and M8. Double-balanced mixer 315 includes switching devices M9, M10, M11, and M12. In an embodiment, switching devices M5-M12 are metal-oxide semiconductor field effect transistors (MOSFETs). Specifically, switching devices M5-M12 are n-channel MOSFETs (NMOS). However, as will be appreciated by one of ordinary skill in the art, switching devices M5-M12 can be implemented using any suitable switching device, including p-channel MOSFETs (PMOS), bipolar junction transistors (BJTs) and junction gate field effect transistors (JFETs). In the embodiment of FIG. 3, switching devices M5-M12 are substantially operated in their linear mode when ON.

Double-balanced mixer 310 receives a differential, in-phase LO signal ($LO_I$) at LO coupling 300. The in-phase LO signal has a frequency of $\omega_{LO}$. Double-balanced mixer 310 is essentially formed from two single-balanced mixers 320 and 325. The gates of switching devices M5 and M7 are coupled to the positive in-phase LO signal ($LO_{I+}$), and the gates of switching devices M6 and M8 are coupled to the negative in-phase LO signal ($LO_{I-}$). Because the two in-phase LO signals ($LO_{I+}$ and $LO_{I-}$) are substantially 180-degrees out of phase, switching device pair M5 and M6 are switched ON and OFF at non-overlapping intervals at the frequency of the in-phase LO signal ($\omega_{LO}$). Likewise, switching device pair M7 and M8 are switched ON and OFF at non-overlapping intervals at the frequency of the in-phase LO signal ($\omega_{LO}$). The non-overlapping switching at a frequency of $\omega_{LO}$ effectively multiplies the positive RF signal, coupled to the sources of switching devices M5 and M6, and the negative RF signal, coupled to the sources of switching devices M7 and M8, by ±1. This effective multiplication results in frequency conversion of the differential RF signal by the sum ($\omega_{RF}+\omega_{LO}$) and difference ($\omega_{RF}-\omega_{LO}$ or $\omega_{LO}-\omega_{RF}$) in frequency between the in-phase LO signal ($LO_I$) and the differential RF signal received from LNA 105 at differential input 200. The frequency translated in-phase component of the RF signal is provided differentially at output 340.

Double-balanced mixer 315 receives a differential, quadrature LO signal ($LO_Q$) at LO coupling 305. The quadrature LO signal has a frequency of $\omega_{LO}$. Double-balanced mixer 315 is essentially formed from two single-balanced mixers 330 and 335. The gates of switching devices M9 and M11 are coupled to the positive quadrature LO signal ($LO_{Q+}$), and the gates of switching devices M10 and M12 are coupled to the negative quadrature LO signal ($LO_{Q-}$). Because the two quadrature LO signals ($LO_{Q+}$ and $LO_{Q-}$) are substantially 180-degrees out of phase, switching device pair M9 and M10 are switched ON and OFF at non-overlapping intervals at the frequency of the quadrature LO signal ($\omega_{LO}$). Likewise, switching device pair M11 and M12 are switched ON and OFF at non-overlapping intervals at the frequency of the quadrature LO signal ($\omega_{LO}$). The non-overlapping switching at a frequency of $\omega_{LO}$ effectively multiplies the positive RF signal, coupled to the sources of switching devices M9 and M10, and the negative RF signal, coupled to the sources of switching devices M11 and M12, by ±1. This effective multiplication results in frequency conversion of the differential RF signal by the sum ($\omega_{RF}+\omega_{LO}$) and difference ($\omega_{RF}-\omega_{LO}$ or $\omega_{LO}-\omega_{RF}$) in frequency between the quadrature-phase LO signal ($LO_Q$) and the differential RF signal. The frequency translated quadrature component of the RF signal is provided differentially at output 345.

The use of double-balanced mixers 310 and 315 effectively removes any DC offset component of the in-phase and quadrature LO signals. Removal of the DC components helps to reduce undesired feed-through of the RF signal at differential outputs 340 and 345.

As further illustrated in FIG. 3, capacitors C3 and C4 are coupled between differential outputs 340 and 345 of passive mixer 110, respectively. Capacitors C3 and C4 can provide high-frequency blocker attenuation, as well suppression of undesired harmonics produced by passive mixer 110. This attenuation of blockers and suppression of undesired harmonics reduces noise and, thereby, increases linearity of front-end 100. In general, capacitors C3 and C4 provide at least partial functionality of filters 115 and 120 illustrated in FIG. 1 and can be fully integrated on-chip with front-end 100.

4. Transconductance Enhanced CG Buffer

As noted above, to achieve high-linearity the impedance seen by passive mixer 110 at its output should be low. A low impedance at the output of passive mixer 110 reduces the voltage swing at the source and drain of switching transistors, M5-M12, used by passive mixer 110, which increases the linearity of front-end 100. However, the conversion gain of front-end 100 is generally given by the product of the transconductance of $g_m$ LNA 105 and the final output load resistance of front-end 100. As a result, there is typically a tradeoff between linearity and gain in conventional front-ends because the linearity improves with a low impedance load, while the gain is directly proportional to the load itself. As will be explained further below, loading the output of passive mixer 110 with the low input impedance of $g_m$-enhanced CG buffers 125 and 130 can achieve both these contrasting objectives (i.e., high-linearity and high-gain).

Figure 4:
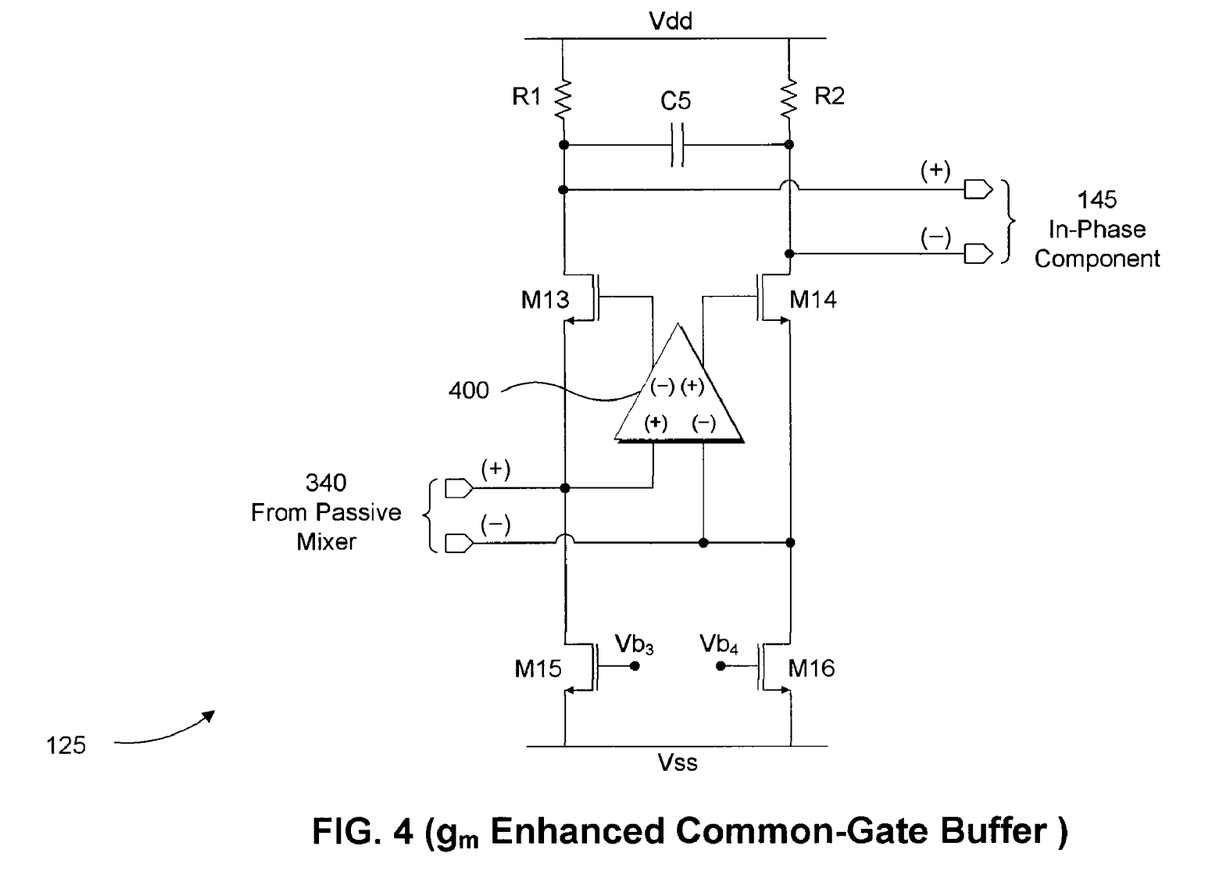
FIG. 4 illustrates an exemplary implementation of a $g_m$-enhanced CG buffer, according to embodiments of the present invention.

FIG. 4 illustrates an exemplary implementation of $g_m$-enhanced CG buffer 125, according to embodiments of the present invention. CG buffer 125 receives a differential input signal 340 (i.e., the frequency translated current signal) from passive mixer 110 and provides a differential output signal 145 (i.e., the in-phase component or a frequency translated voltage signal). Differential input signal 340 is applied to the sources of transistors M13 and M14 and differential output signal 145 is taken at the drains of transistors M13 and M14.

The input resistance of a typical CG buffer is around 50-100 Ohms, which is generally not small enough to achieve the desired high-conversion gain. An additional single stage amplifier 400 is added at the input of CG buffer 125 to reduce its input resistance. Specifically, a positive end of differential input signal 340 is coupled to a positive input of additional amplifier 400, and a negative end of differential input signal 340 is coupled to a negative input of additional amplifier 400. The negative output end of additional amplifier 400 is coupled to the gate of transistor M13 and the positive output end of additional amplifier 400 is coupled to the gate of transistor M14.

The input resistance of CG buffer 125, without additional amplifier 400, is approximately given by $1/g_m$, where $g_m$ is the transconductance of transistors M13 and M14. With additional amplifier 400, the input resistance is effectively reduced and is given by $1/(A*g_m)$, where 'A' is the gain of additional amplifier 400. In other words, the input resistance of CG buffer 125 is reduced by a factor of 'A', thereby creating a $g_m$-enhanced CG buffer.

Transistors M15 and M16 are coupled between the respective sources of input stage transistors M13 and M14 and reference potential Vss (e.g., ground). Transistors M15 and M16 are biased at their gates by bias voltages $Vb_3$ and $Vb_4$, respectively. Transistors M15 and M16 are configured as a current source to provide DC current to the CG buffer 125.

Resistors R1 and R2 and capacitor C5 form the load of CG buffer 125 and are coupled between supply voltage Vdd and the respective drains of input stage transistors M13 and M14.

The small signal voltage gain of CG buffer 125 is approximately given by $A*g_m*R1$ or, alternatively, $A*gm*R2$ (assuming R1=R2). Therefore, as a result of the low input impedance and high $g_m$ of CG buffer 125, as desired, the voltage gain of CG buffer 125 can be quite large. The current flowing from the source-to-drain of transistors M13 and M14 will be converted to a voltage signal by resistors R1 and R2, thereby maximizing the conversion gain (i.e., current-to-voltage) at differential output 145.

It should be noted that only a detailed embodiment of $g_m$-enhanced CG buffer 125 has been illustrated herein. However, as will be appreciated by one of ordinary skill in the art, $g_m$-enhanced CG buffer 130 (illustrated in FIG. 1) can be implemented similar to the detailed embodiment of $g_m$-enhanced CG buffer 125 illustrated in FIG. 4, but is further not limited thereto.

Figure 5:
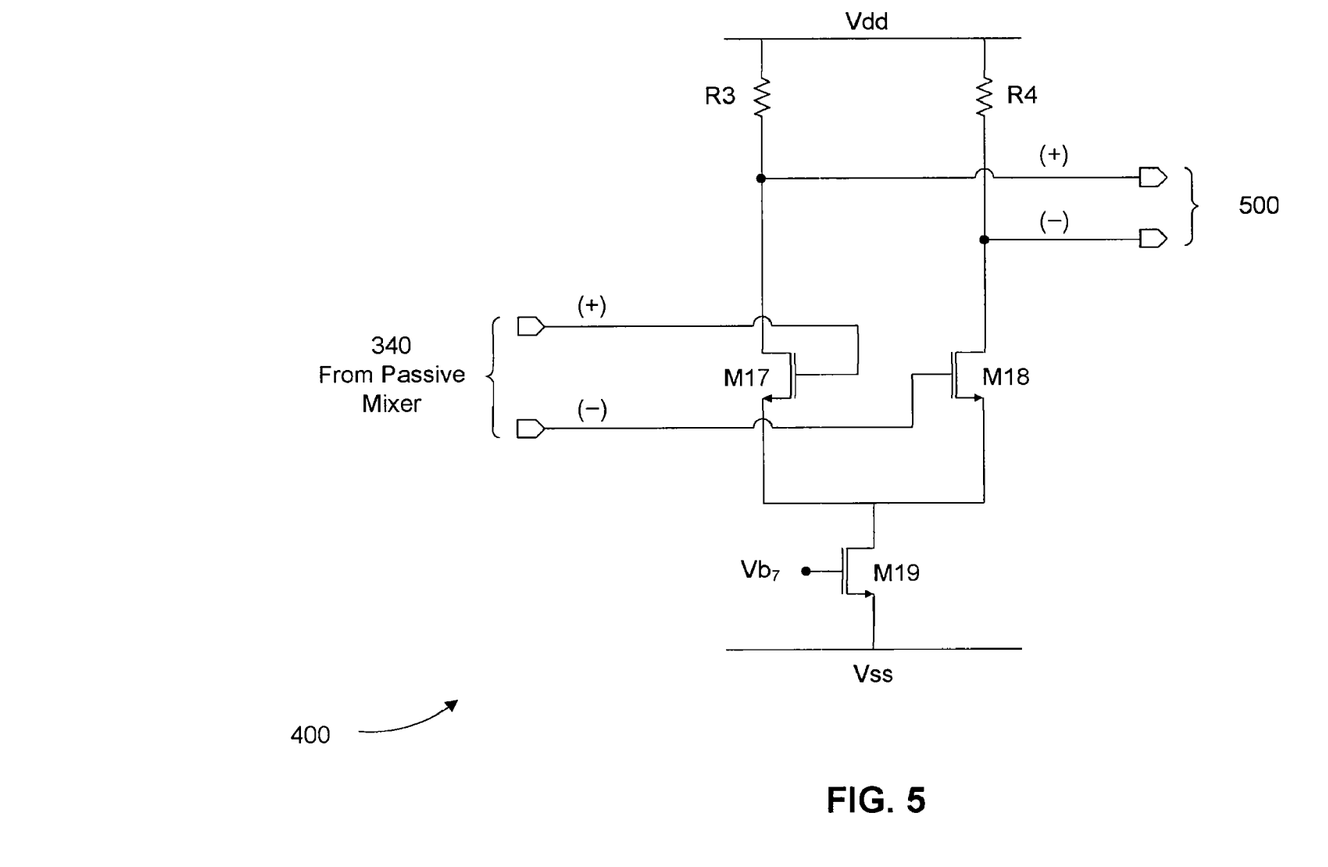
FIG. 5 illustrates an exemplary implementation of an additional amplifier for enhancing the $g_m$ of the CG buffer illustrated in FIG. 4, according to embodiments of the present invention.

FIG. 5 illustrates an exemplary implementation of additional amplifier 400 for enhancing the $g_m$ of CG buffer 125 illustrated in FIG. 4, according to embodiments of the present invention. Additional amplifier 400 receives differential input signal 340 from passive mixer 110 and provides an amplified differential output signal 500, coupled to the gates of transistors M13 and M14, which form the input stage of CG Buffer 125. Additional amplifier 400 includes resistors R3 and R4, a differential transistor pair M17 and M18, and a current bias transistor M19. Supply voltage Vdd is provided to resistors R3 and R4 and a reference voltage (e.g., ground) is coupled to current bias transistor M19. Bias voltage $Vb_7$ is used to control the current flowing through current bias transistor M19. The maximum output voltage swing of additional amplifier 400 is approximately equal to the current flowing through current bias transistor M19 times the resistance of either R3 or R4, depending on the polarity of input signal.

5. Conclusion

It is to be appreciated that the Detailed Description section, and not the Abstract section, is intended to be used to interpret the claims. The Abstract section may set forth one or more but not all exemplary embodiments of the present invention as contemplated by the inventor(s), and thus, is not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A radio frequency (RF) receiver front-end, comprising:
    a transconductance low noise amplifier (LNA) configured to convert an RF voltage signal to an RF current signal;
    a passive mixer configured to mix the RF current signal with a local oscillator signal to produce a frequency translated current signal; and
    a common-gate buffer configured to receive the frequency translated current signal at an input of the common-gate buffer and convert the frequency translated current signal to a frequency translated voltage signal,
    wherein the common-gate buffer comprises an additional amplifier configured to increase a transconductance of the common-gate buffer by amplifying the frequency translated current signal before the frequency translated current signal is received at the input of the common-gate buffer.

2. The RF receiver front-end of claim 1, wherein the transconductance LNA is configured as a single-stage, common-source amplifier.

3. The RF receiver front-end of claim 1, wherein the passive mixer is AC coupled to the output of the transconductance LNA.

4. The RF receiver front-end of claim 1, wherein the passive mixer is current driven.

5. The RF receiver front-end of claim 1, wherein the passive mixer comprises a first double-balanced mixer and a second double-balanced mixer.

6. The RF receiver front-end of claim 1, wherein the transconductance of the common-gate buffer is increased by a factor of 'A', where 'A' is substantially equal to a gain of the additional amplifier.

7. The RF receiver front-end of claim 6, wherein the common-gate buffer further comprises a transistor configured to receive the frequency translated current signal at a source terminal and provide the frequency translated voltage signal at a drain terminal.

8. The RF receiver front-end of claim 7, wherein a gate of the transistor is coupled to the output of the additional amplifier.

9. The RF receiver front-end of claim 1, wherein a capacitive filter is coupled between the passive mixer and the common-gate buffer.

10. A radio frequency (RF) receiver front-end, comprising:
    a passive mixer configured to mix an RF current signal with a local oscillator signal to produce a frequency translated current signal;
    an additional amplifier configured to receive the frequency translated current signal and provide an amplified frequency translated current signal; and
    a common-gate buffer configured to receive the amplified frequency translated current signal and convert the amplified frequency translated current signal to a frequency translated voltage signal,
    wherein the additional amplifier is configured to increase a transconductance of the common-gate buffer to limit a voltage swing of the frequency translated current signal.

11. The RF receiver front-end of claim 10, wherein the passive mixer is AC coupled to an output of a transconductance LNA.

12. The RF receiver front-end of claim 10, wherein the passive mixer is current driven.

13. The RF receiver front-end of claim 10, wherein the passive mixer comprises a first double-balanced mixer and a second double-balanced mixer.

14. The RF receiver front-end of claim 10, wherein the transconductance of the common-gate buffer is increased by a factor of 'A', where 'A' is substantially equal to the gain of the additional amplifier.

15. The RF receiver front-end of claim 14, wherein the common-gate buffer includes a transistor configured to receive the amplified frequency translated current signal at a source terminal and provide the frequency translated voltage signal at a drain terminal.

16. The RF receiver front-end of claim 15, wherein a gate of the transistor is coupled to the output of the additional amplifier.

17. The RF receiver front-end of claim 10, wherein a capacitive filter is coupled between the passive mixer and the common-gate buffer.

* * * * *